(12) United States Patent  
Mori

(10) Patent No.: US 8,760,528 B2  
(45) Date of Patent: Jun. 24, 2014

(54) IMAGE CAPTURE APPARATUS AND CONTROL METHOD THEREOF

(75) Inventor: Naomi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/451,119

(22) Filed: Apr. 19, 2012

(65) Prior Publication Data

US 2012/0274806 A1    Nov. 1, 2012

(30) Foreign Application Priority Data

Apr. 27, 2011   (JP) ................................. 2011-100137

(51) Int. Cl.
*H04N 5/235*     (2006.01)
(52) U.S. Cl.
USPC .................................. 348/221.1; 348/333.02
(58) Field of Classification Search
None
See application file for complete search history.

(56) References Cited

U.S. PATENT DOCUMENTS 7,830,441 B2 *  11/2010  Tsukatani ................ 348/333.11
8,203,641 B2 *   6/2012  Mori ........................ 348/333.12

FOREIGN PATENT DOCUMENTS

JP          2003-092703         3/2003

* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

An image capture apparatus capable of auto bracketing. When a capture count for the auto bracketing is N (N is an integer of not less than three), a total of N−1 correction values are set by at least one on each of a positive side and negative side with respect to a reference value, and the apparatus sequentially expands or narrows a correction width serving as a difference between the reference value and each of the N−1 correction values in accordance with user's operation. When the capture count is two, the reference value and one correction value are set, and the apparatus sequentially increases or decreases the one correction value within the predetermined range in accordance with user's operation.

9 Claims, 9 Drawing Sheets

801

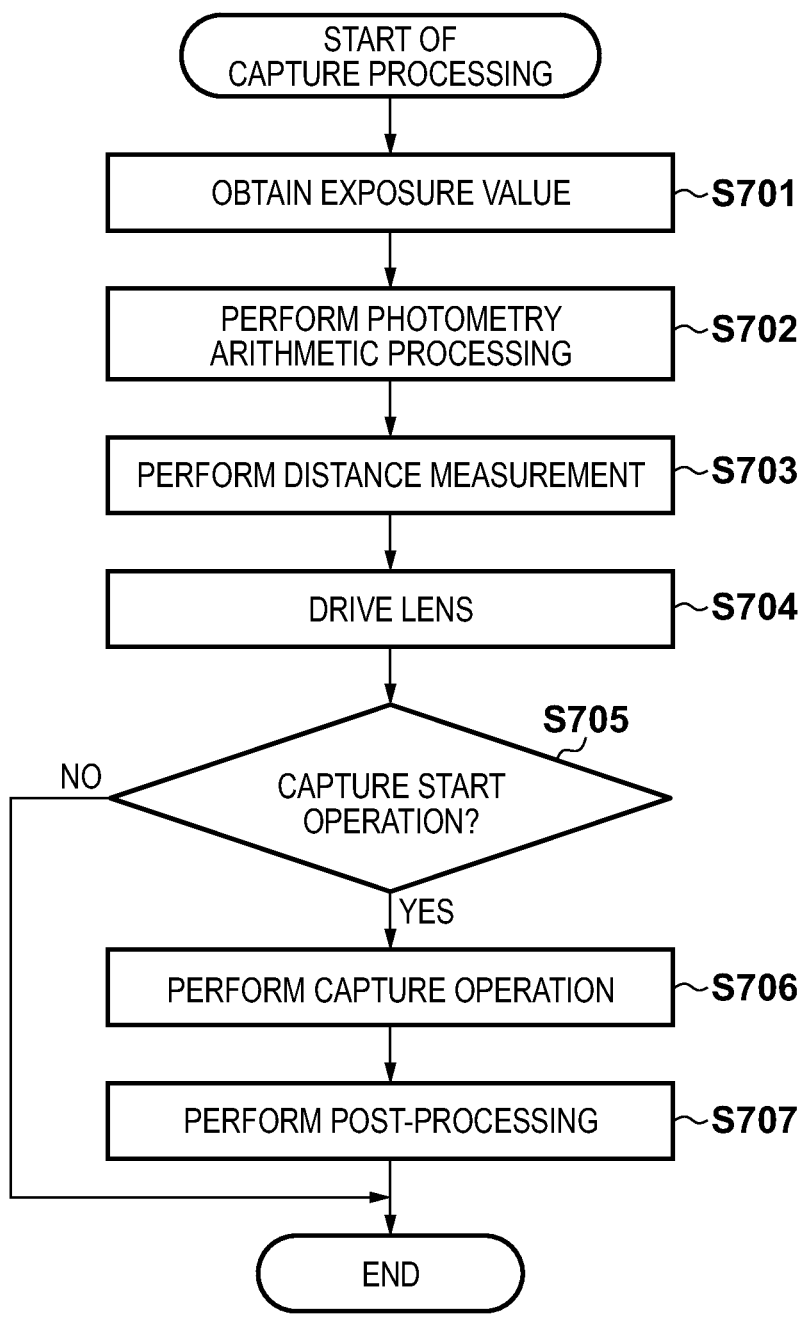

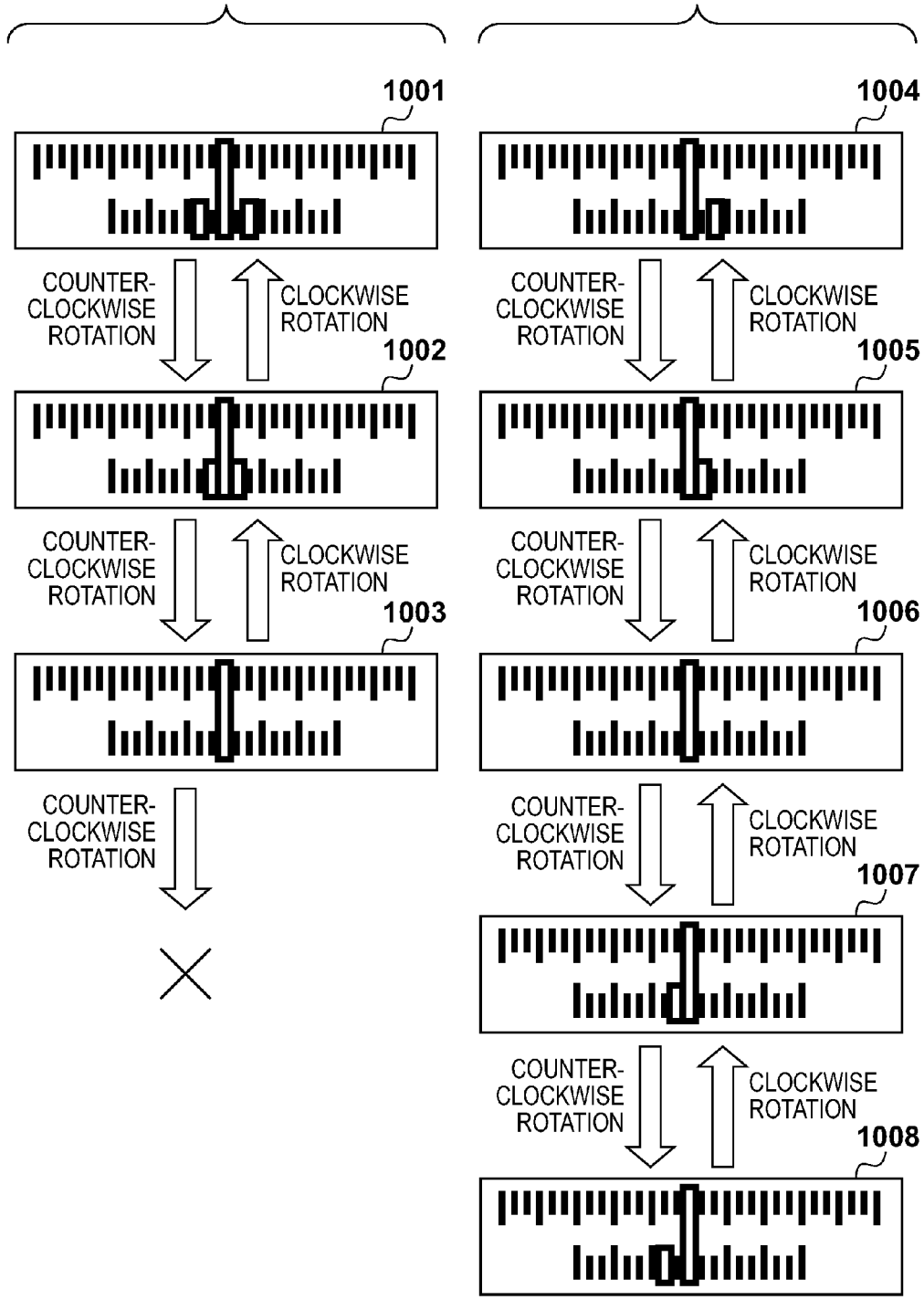

IMAGE CAPTURE APPARATUS AND CONTROL METHOD THEREOF

BACKGROUND OF THE INVENTION

1. Field of the Invention

The present invention relates to an image capture apparatus such as a digital camera and a control method thereof and, more particularly, to a correction value setting operation in auto bracketing.

2. Description of the Related Art

Image capture apparatuses such as a digital camera generally implement auto bracketing to capture a plurality of images by setting a specific capture setting item to a reference value and correction values obtained by increasing and decreasing a correction step amount with respect to the reference value. Image capture apparatuses capable of auto bracketing can set a correction step amount. For example, in auto bracketing for a capture count of three, three images are captured by sequentially setting, as the set value of the capture setting item, a set reference value and two correction values (positive and negative correction values) obtained by adding and subtracting the correction step amount to and from the reference value. Japanese Patent Laid-Open No. 2003-092703 discloses an image capture apparatus in which, when an auto bracketing setting mode is set, an auto bracketing reference value can be set by using the first operation means and a correction step amount for auto bracketing can be set with respect to the reference value by using the second operation means.

Correction values in auto bracketing are determined based on the reference value and correction step amount. Negative and positive correction values are apart from the reference value on the negative and positive sides by the same correction step amount (correction width). For example, when performing auto bracketing in regard to exposure, images are captured at a set exposure (reference value), and preceding and succeeding exposures (correction values). This can prevent a failure in capture more reliably.

In general, the user can adjust the correction step amount in auto bracketing. For example, a user interface has come into practical use to expand the correction step amount by rotating a dial clockwise and narrow it by rotating the dial counterclockwise.

User demands are diversifying, and some users consider it sufficient to perform auto bracketing at a reference value and a correction value on either the positive or negative side with respect to the reference value. These users may want to set the capture count of auto bracketing to two.

When the capture count of auto bracketing is three, as described above, two correction values are determined based on the reference value and correction step amount. However, when the capture count of auto bracketing is set to two, which of negative and positive correction values is to be set cannot be determined by only the reference value and correction step amount. The above-mentioned user interface can only expand or narrow the correction step amount in accordance with the dial operation direction, and cannot change the correction value from the negative side to the positive side or from the positive side to the negative side across the reference value. Therefore, when the user sets the capture count to two and adjusts the correction step amount of auto bracketing, he needs to set the positive or negative sign separately in addition to adjustment of the correction step amount, complicating the operation.

SUMMARY OF THE INVENTION

The present invention has been made to solve the above problems. An image capture apparatus and a control method thereof according to one aspect can easily set a correction value even when the capture count in auto bracketing is two in an image capture apparatus capable of auto bracketing.

According to one aspect of the present invention, there is provided an image capture apparatus capable of auto bracketing to obtain a plurality of images by setting a set value of a capture setting item to a reference value and at least one correction value, comprising: a setting unit configured to set a capture count in the auto bracketing in accordance with a user operation; and a change unit configured to change the correction value in the auto bracketing within a predetermined range including a positive value and negative value with respect to the reference value in accordance with a first operation signal and second operation signal corresponding to user operations, wherein when the capture count is N (N is an integer of not less than three), a total of N−1 correction values are set by at least one on each of a positive side and negative side with respect to the reference value, and the change unit sequentially expands a correction width serving as a difference between the reference value and each of the N−1 correction values in accordance with one operation signal out of the first operation signal and the second operation signal, and sequentially narrows the correction width in accordance with the other operation signal until the correction width reaches 0, and when the capture count is two, the reference value and one correction value are set, and the change unit sequentially increases the one correction value within the predetermined range in accordance with one operation signal out of the first operation signal and the second operation signal, and sequentially decreases the one correction value within the predetermined range in accordance with the other operation signal.

Further features of the present invention will become apparent from the following description of exemplary embodiments with reference to the attached drawings.

BRIEF DESCRIPTION OF THE DRAWINGS

FIG. 7 is a flowchart showing capture processing;

FIG. 10A is a view showing a display transition example when the "capture count in auto bracketing" is three and the user operates a main electronic dial 115; and FIG. 10B is a view showing a display transition example when the "capture count in auto bracketing" is two and the user operates the main electronic dial 115.

DESCRIPTION OF THE EMBODIMENTS

A preferred embodiment of the present invention will now be described with reference to the accompanying drawings.

Figure 1:
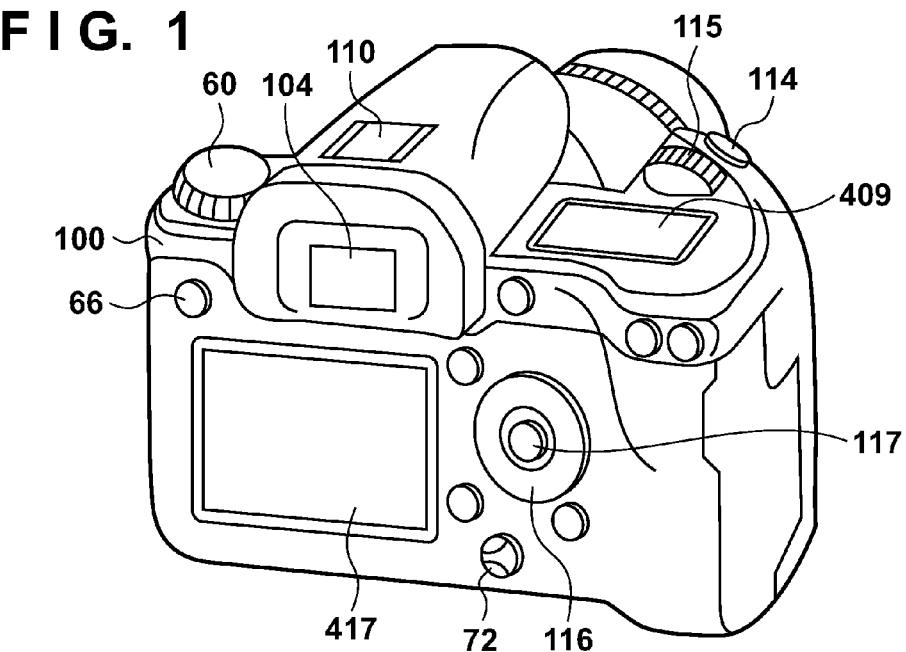
FIG. 1 is a view showing the outer appearance of an image capture apparatus (digital single-lens reflex camera) according to an embodiment.
Figure 2:
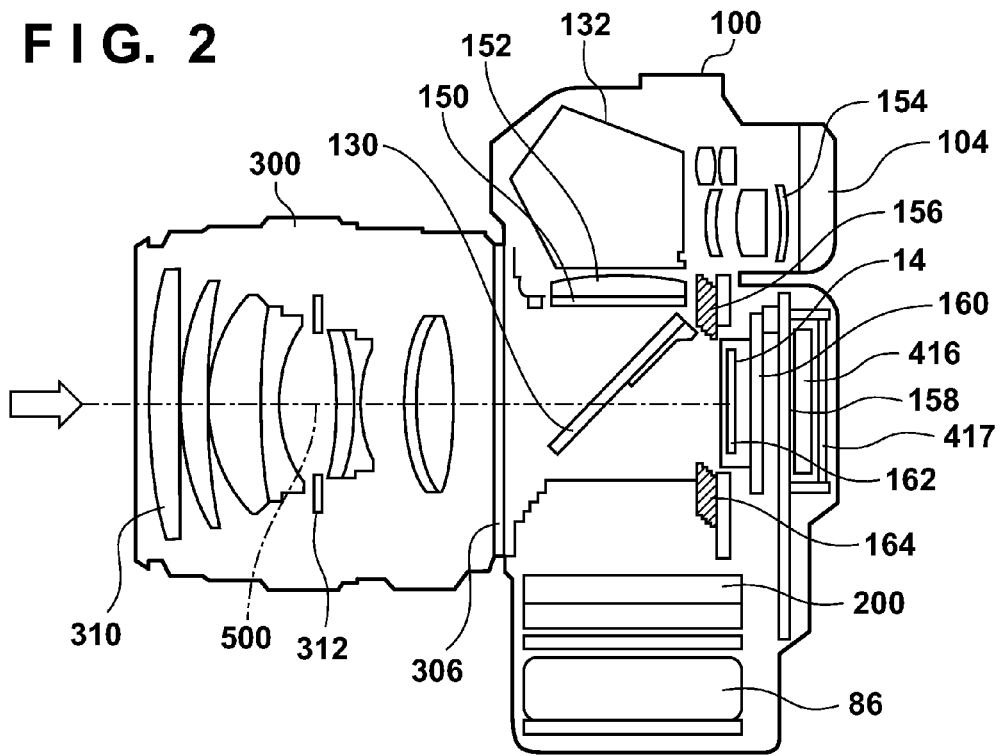
FIG. 2 is a sectional view showing the internal arrangement of the image capture apparatus shown in FIG. 1.

FIG. 1 is a view showing the outer appearance of an image capture apparatus according to the embodiment. FIG. 2 is a sectional view showing the internal arrangement of the image capture apparatus shown in FIG. 1. The image capture apparatus shown in FIGS. 1 and 2 is configured as a digital single-lens reflex camera (to be referred to as a camera body) 100.

The top of the camera body 100 includes an accessory shoe 110, optical viewfinder 104, and release button 114. The top of the camera body 100 also includes a main electronic dial 115, capture mode dial 60, and external display unit 409. The release button 114 is used to instruct a capture operation. The main electronic dial 115 is used to change a shutter speed value, f-number, or the like by directly operating it, or input a numerical value regarding a camera operation or change a capture setting by operating it together with another operation button. The external display unit 409 is formed from a liquid crystal panel or the like, and displays capture conditions (for example, shutter speed value, f-number, and capture settings), and other kinds of information. The capture mode dial 60 is used to change the capture mode.

The rear surface of the camera body 100 includes an LCD monitor unit 417, MENU button 66, sub-electronic dial 116, SET button 117, and power switch 72. The rear surface further includes operation members such as a four-way selector key and multicontroller (none are shown).

The LCD monitor unit 417 is used to display a captured image (image data), various setting screens, and the like. The LCD monitor unit 417 is formed from a transmission LCD, and includes a backlight 416 (see FIG. 2). Note that the LCD monitor unit 417 is also used as a display for displaying a menu screen for designating various settings, processes, and the like possible in the image capture apparatus, and screens (FIGS. 8A to 8C) for setting values necessary for AEB bracketing (to be described later).

The MENU button 66 is operated to instruct a system control circuit 50 to start/end menu display and display a menu on the LCD monitor unit 417. The sub-electronic dial 116 is used to change a shutter speed value, f-number, or the like by directly operating it, similar to the main electronic dial 115. Also, the sub-electronic dial 116 is used to input a numerical value regarding a camera operation or change a capture setting by operating it together with another operation button. The SET button 117 is used for selection, finalization, and the like in the menu display.

Figure 3:
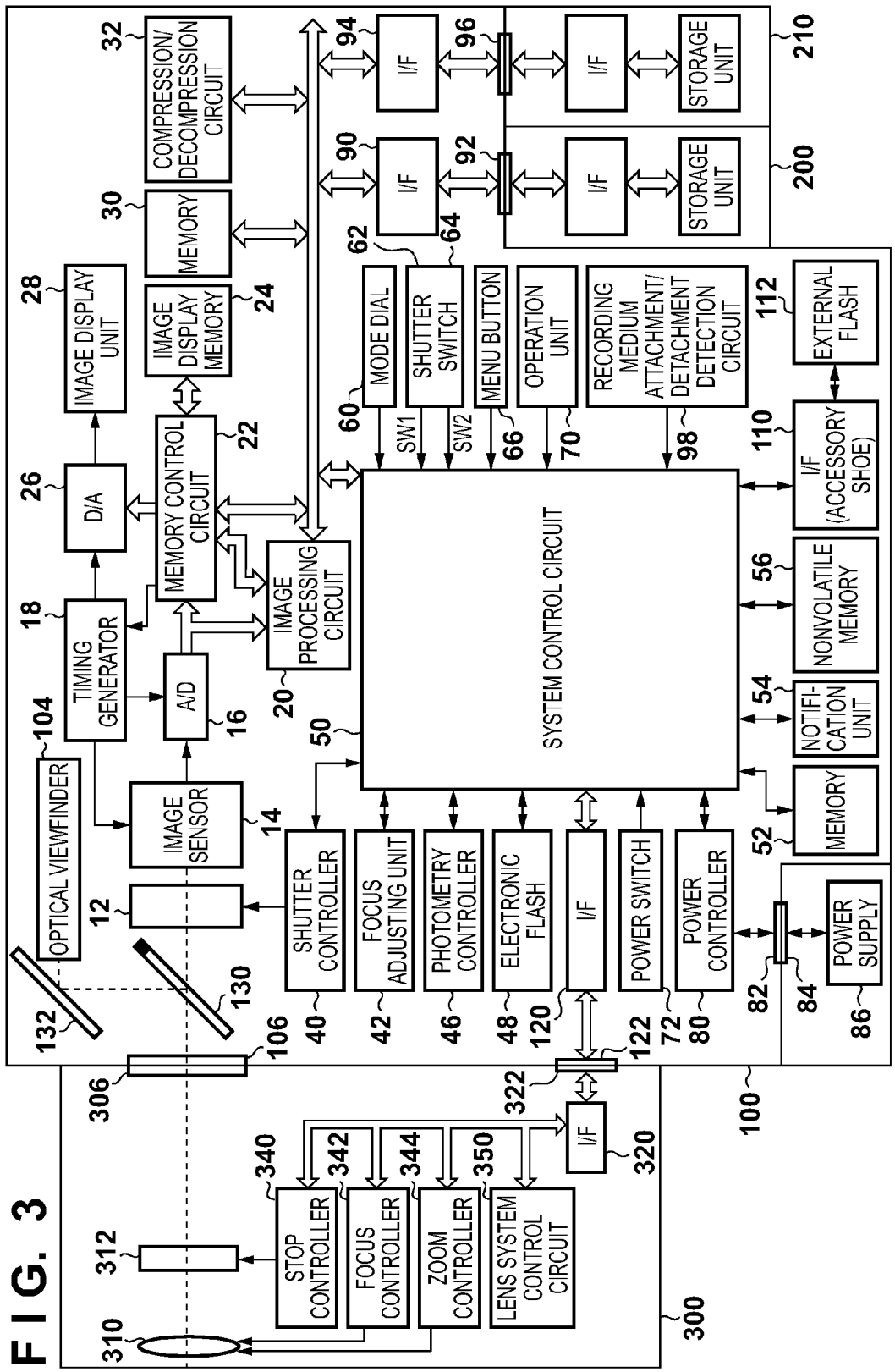
FIG. 3 is a block diagram showing the circuit arrangement of the image capture apparatus shown in FIG. 1.

The front surface of the camera body 100 includes a mount 106 (see FIG. 3). A mount 306 of an exchangeable lens 300 is detachably coupled to the mount 106. Referring to FIG. 2, reference numeral 500 denotes an imaging optical axis. The exchangeable lens 300 includes a lens unit 310 formed from a plurality of lenses, and an aperture 312.

In the camera body 100, a mirror 130 is inserted in the imaging optical path. The mirror 130 is movable between a position (position shown in FIG. 2) where the mirror 130 reflects object light traveling from the lens unit 310 to the optical viewfinder system, and a position where it retracts from the imaging optical path. Object light reflected by the mirror 130 forms an object image on a focusing plate 150.

A condenser lens 152 improves the visibility of the viewfinder. A pentagonal roof prism 132 guides object light having passed through the focusing plate 150 and condenser lens 152 to an eyepiece lens 154. These components including the focusing plate 150, condenser lens 152, and eyepiece lens 154 form the optical viewfinder 104. The user can observe an object image formed on the focusing plate 150 via the eyepiece lens 154.

A rear curtain 156 and front curtain 164 form a focal plane shutter 12 (see FIG. 3). By opening control of the rear curtain 156 and front curtain 164, an image sensor 14 is exposed for a necessary time. The image sensor 14 is formed from a CCD sensor or CMOS sensor, and an optical low-pass filter 162 is arranged in front of the image sensor 14. The image sensor 14 is connected to a printed board 160. A display board 158 is arranged behind the printed board 160.

A recording medium 200 records image data obtained by a capture operation, and is formed from a semiconductor memory, hard disk, or the like. Reference numeral 86 denotes a secondary battery. The recording medium 200 and secondary battery 86 are detachable from the camera body 100.

The circuit arrangements of the camera body 100 and exchangeable lens 300 will be explained with reference to FIG. 3. In FIG. 3, the same reference numerals as those in FIGS. 1 and 2 denote the same parts as those in FIGS. 1 and 2.

The internal circuit arrangement of the exchangeable lens 300 will be described first. The exchangeable lens 300 includes a connector 322 and interface 320 for electrically connecting the exchangeable lens 300 to the camera body 100. The connector 322 and interface 320 enable communication between a lens system control circuit 350 (to be described later) and the system control circuit 50 in the camera body 100 via a connector 122 and interface 120 of the camera body 100.

An aperture controller 340 controls the aperture 312. The aperture controller 340 controls the aperture 312 based on photometry information from a photometry controller 46 (to be described later) while cooperating with a shutter controller 40. A focus controller 342 controls the focusing operation of the lens unit 310. A zoom controller 344 controls the zooming operation of the lens unit 310. The lens system control circuit 350 controls all various operations of the exchangeable lens 300. The lens system control circuit 350 includes a memory storing constants, variables, and computer programs for various operations.

Next, the internal circuit arrangement of the camera body 100 will be described. Object light having passed through the lens unit 310 and aperture 312 passes through the released focal plane shutter 12 and enters the image sensor 14 while the mirror 130 retracts from the imaging optical path (when the mirror 130 is a half-mirror, it remains inserted in the imaging optical path). The image sensor 14 photoelectrically converts the incident object light and outputs it as an analog image signal.

An A/D converter 16 converts an analog signal (image signal) output from the image sensor 14 into a digital signal. A timing generator 18 supplies clock signals and control signals to the image sensor 14, the A/D converter 16, and a D/A converter 26 under the control of a memory control circuit 22 and the system control circuit 50.

An image processing circuit 20 performs pixel interpolation processing and color conversion processing for image data from the A/D converter 16 or image data from the memory control circuit 22. Also, the image processing circuit 20 performs predetermined arithmetic processing using image data output from the A/D converter 16. Based on the arithmetic result, the system control circuit 50 executes TTL auto focus processing (AF), auto exposure processing (AE), and pre-electronic flash processing (EF) to control the shutter controller 40 and a focus adjusting unit 42. The image processing unit 20 also executes predetermined arithmetic processing using image data output from the A/D converter 16, and performs even TTL auto white balance (AWB) processing based on the arithmetic result.

The memory control circuit 22 controls the A/D converter 16, the timing generator 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

An image display unit 28 implements an electronic viewfinder (EVF) function by sequentially displaying, on the LCD monitor unit 417 shown in FIGS. 1 and 2, image signals which have been converted into analog signals by the D/A converter 26 and written in the image display memory 24. Note that the image display unit 28 enables/disables the electronic viewfinder (EVF) function in accordance with an instruction from the system control circuit 50.

The memory 30 stores captured still images. The memory 30 is used as a frame buffer for continuously writing images at a predetermined rate on the recording medium 200 or in an accessory apparatus 210 in moving image capture. The memory 30 is also used as the work area of the system control circuit 50. The compression/decompression circuit 32 compresses/decompresses image data using a known image compression method. The compression/decompression circuit 32 reads an image stored in the memory 30, compresses or decompresses it, and writes the processed data again in the memory 30.

The shutter controller 40 controls the shutter speed of the focal plane shutter 12 based on photometry information from the photometry controller 46 while cooperating with the aperture controller 340. The focus adjusting unit 42 performs AF (Auto Focus) processing by detecting the phase difference of object light which has been guided by a sub-mirror (not shown) after passing through the mirror 130. The photometry controller 46 performs AE (Auto Exposure) processing based on an output signal from a photometry sensor (not shown). An electronic flash 48 has an AF auxiliary light projecting function and electronic flash control function. Note that the photometry controller 46 performs EF (Electronic Flash control) processing in cooperation with the electronic flash 48.

The system control circuit 50 includes a CPU and memory, and controls the overall operation of the camera body 100. A memory 52 stores constants, variables, and computer programs (basic programs) for the operation of the system control circuit 50. A notification unit 54 notifies the outside of a camera operation state, message, and the like by displaying a text or image using an LCD, LED, or the like, and generating sound from a loudspeaker (not shown) in accordance with execution of a computer program by the system control circuit 50. The notification unit 54 includes an LCD unit for displaying an f-number, shutter speed, focusing degree, camera shake warning, exposure correction value, and the like within the optical viewfinder 104.

A nonvolatile memory 56 is formed from an electrically erasable/programmable EEPROM, and is used as a memory for storing computer programs and the like. In this case, computer programs are computer-readably stored in the nonvolatile memory 56, as a matter of course. The computer programs include computer-executable application programs according to the flowcharts of FIGS. 4 to 7 (to be described later). The nonvolatile memory 56 also stores values set on a GUI screen such as a menu screen, values set by operating the main electronic dial 115 and sub-electronic dial 116, capture mode information designated by operating the capture mode dial 60, and the like.

A shutter switch (SW1) 62 is turned on by the first stroke operation (half stroke) of the release button 114, and instructs the system control circuit 50 of the start of an operation such as AF processing, AE processing, AWB processing, or EF processing. A shutter switch (SW2) 64 is turned on by the second stroke operation (full stroke) of the release button 114, and instructs the system control circuit 50 of the start of a series of capture processes including exposure processing, development processing, and recording processing. An operation unit 70 includes various buttons such as the SET button 117, and various dials such as the main electronic dial 115, sub-electronic dial 116, and capture mode dial 60. The system control circuit 50 performs various operations in accordance with signals from the operation unit 70.

The power switch 72 is used to switch the camera body 100 between power ON and power OFF. The power switch 72 can also be operated to simultaneously switch, between power ON and power OFF, the exchangeable lens 300, an external flash 112, the recording medium 200, and the accessory apparatus (for example, personal computer) 210 which are connected to the camera body 100.

A power controller 80 includes a battery detection circuit, a DC/DC converter, and a switching circuit configured to switch a block to be energized. The power controller 80 detects attachment/detachment of a battery, battery type, and battery level. The power controller 80 controls the DC/DC converter based on the detection result and an instruction from the system control circuit 50, and supplies necessary voltages to the respective units including the recording medium 200 for a necessary period.

Connectors 82 and 84 supply power from a power supply such as the secondary battery 86 to the camera body 100, exchangeable lens 300, external flash 112, recording medium 200, and accessory apparatus 210. Reference numerals 90 and 94 denote interfaces with the recording medium 200 and accessory apparatus 210; and 92 and 96, connectors to connect the recording medium 200 and accessory apparatus 210. An attachment/detachment detection circuit 98 detects whether the recording medium 200 and accessory apparatus 210 are connected to the connectors 92 and 96.

Figure 8A:
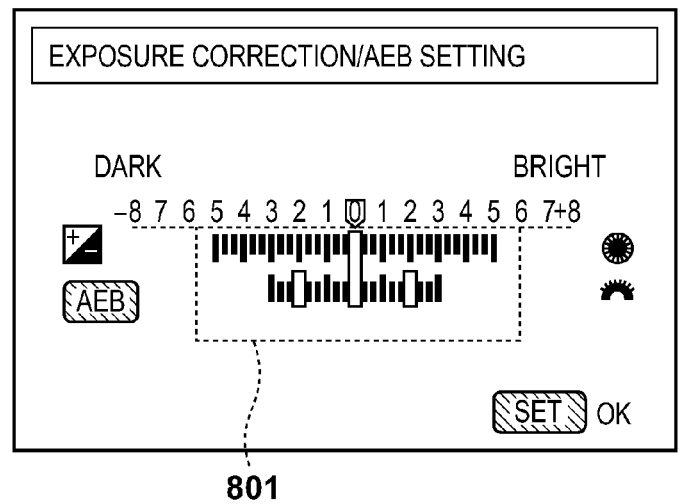
FIG. 8A is a view showing a display example of a screen for setting an exposure correction value and AEB correction value.
Figure 8B:
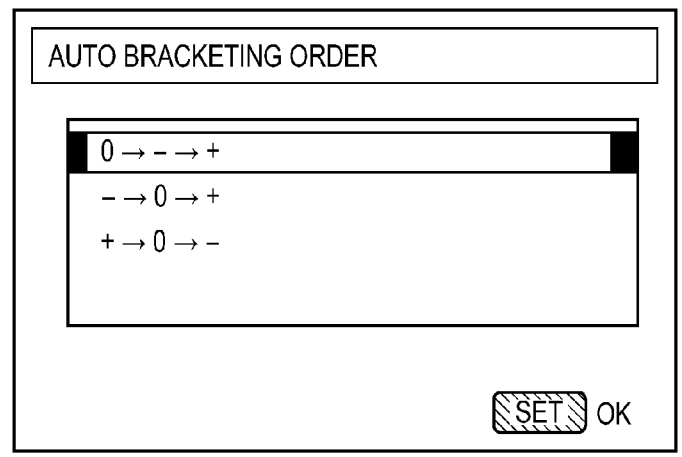
FIG. 8B is a view showing a display example of a screen for setting an auto bracketing order.
Figure 8C:
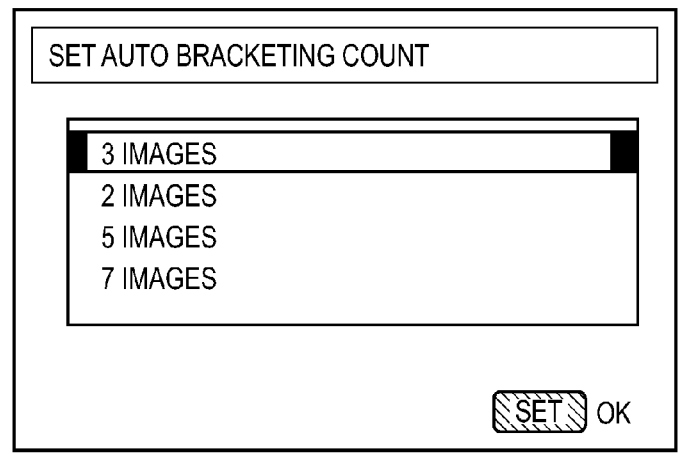
FIG. 8C is a view showing a display example of a screen for setting a capture count for which the correction amount is changed in auto bracketing.

The embodiment will be explained using an example in which the capture setting item is exposure correction, that is, auto exposure auto bracketing (to be referred to as AEB bracketing) is applied as auto bracketing. FIGS. 8A to 8C show display examples of screens for setting values necessary for AEB bracketing. In the following description, a positive correction value will be referred to as a + correction value, and a negative correction value will be referred to as a − correction value. FIG. 8A shows a display example of a screen for setting an exposure correction value serving as an exposure reference value, and an AEB correction step amount (to be referred to as an AEB correction width which is a positive value). FIG. 8B shows a display example of a screen for setting an auto bracketing order. For example, when AEB bracketing is executed at a setting "0→−→+" as shown in FIG. 8B, images are captured at exposure correction values in the order of a reference value, − correction value (reference value−AEB correction width), and + correction value (reference value+ AEB correction width). Note that the reference value is a value serving as a reference brightness to which exposure is adjusted in auto exposure capture processing (AE). Based on this value, AE is executed. The reference value can be changed by an exposure correction operation by the user.

FIG. 8C shows a display example of a screen for setting the number of images to be captured (capture count) at different correction amounts in auto bracketing. When the capture count is changed from three to two on this screen, the AEB correction value changes from an AEB correction value for the capture count of three to an AEB correction value for the capture count of two (to be referred to as AEB correction value [2]). At this time, a value obtained by adding a sign used first in capture in the auto bracketing order except for 0 to an AEB correction width corresponding to the capture count of three serves as the initial value of the AEB correction value [2] corresponding to the capture count of two. For example, when the capture count is changed to two while "0→−→+" is selected on the order setting screen of FIG. 8B, a sign used first in capture except for "0" is "−", and a value obtained by subtracting the AEB correction width from the reference value serves as the AEB correction value [2]. This means that, when the capture count is changed from three to two, a correction value used first in a set capture order out of two correction values corresponding to the capture count of three is set as a correction value (AEB correction value [2]) corresponding to the capture count of two. The AEB correction value [2] can be changed based on a user operation by processing to be referred later with reference to FIG. 6. To the contrary, when the capture count is changed from two to three, the − correction value serving as one correction value is obtained by subtracting the AEB correction width (absolute value of the AEB correction value [2]) from the reference value, and the + correction value serving as the other correction value is obtained by adding the AEB correction width to the reference value. Note that the AEB correction value [2] may be stored independently of an AEB correction width corresponding to the capture count of three. In this case, the AEB correction value [2] is not updated upon changing the capture count from three to two, and is not changed from the stored previous AEB correction value [2]. Alternatively, only the sign of the AEB correction value [2] may be stored independently of an AEB correction width corresponding to the capture count of three. In this case, when the capture count is changed from three to two, the initial value of the AEB correction value [2] may be used as a positive/negative correction value stored out of two correction values corresponding to the capture count of three.

The display changes to each setting screen in response to selection from a menu list displayed by pressing the MENU button 66. In the setting screen of FIG. 8A, the AEB correction value (correction width) is changed with the main electronic dial 115, the exposure correction value serving as a reference value is changed with the sub-electronic dial 116, and the change is finalized with the SET button. In the setting screens of FIGS. 8B and 8C, a setting is selected with the sub-electronic dial 116, and the change is finalized with the SET button.

Figure 9A:
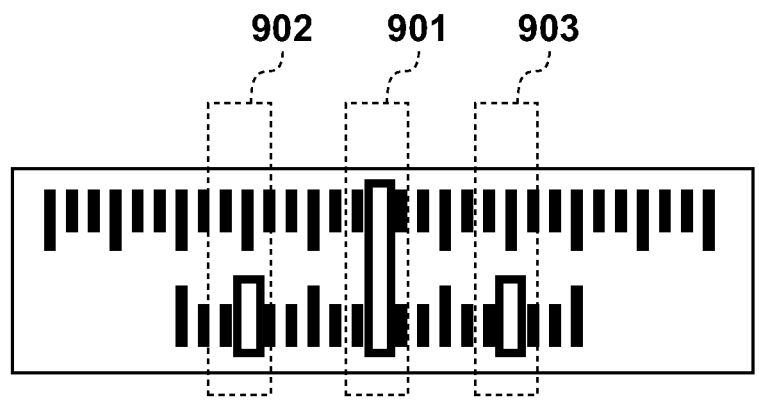
FIG. 9A is a view showing a display example when the "capture count in auto bracketing" is three.
Figure 9B:
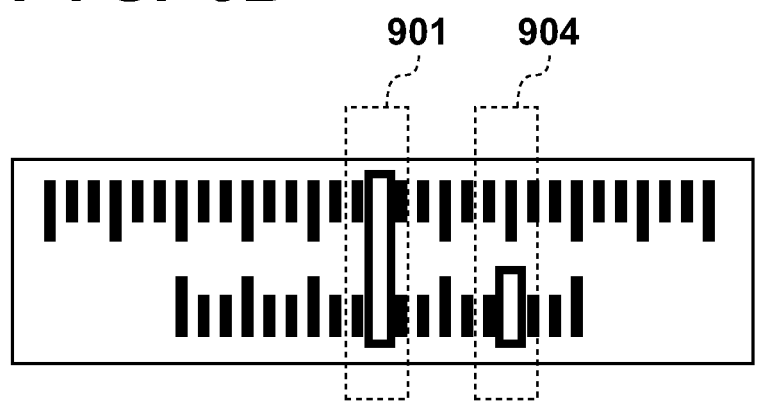
FIGS. 9B and 9C are views each showing a display example when the "capture count in auto bracketing" is two.
Figure 9C:
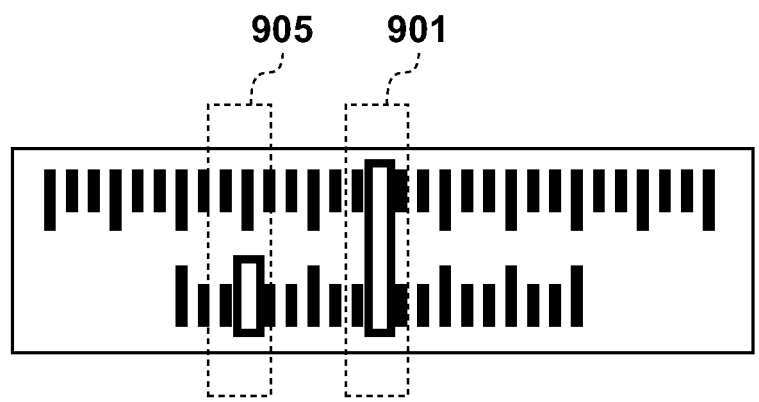

FIGS. 9A to 9C are views showing display examples of a display portion 801 of the exposure correction value and AEB correction value in "exposure correction/AEB setting" of FIG. 8A. FIG. 9A shows a display example when the "capture count in auto bracketing" is set to three in the capture count setting menu shown in FIG. 8C. An index 901 indicates an exposure correction value (reference value). An index 902 indicates the − correction value of the AEB correction value. An index 903 indicates the + correction value of the AEB correction value. FIGS. 9B and 9C show display examples when the "capture count in auto bracketing" is set to two in the capture count setting menu shown in FIG. 8C. An index 904 indicates a + correction value serving as the AEB correction value [2]. An index 905 indicates a − correction value serving as the AEB correction value [2].

FIGS. 10A and 10B show the display portion 801 in FIG. 8A, and show transition examples of the exposure correction value (reference value) and AEB correction value in "exposure correction/AEB setting" in accordance with user operations. FIG. 10A shows a display example when the user operates the main electronic dial 115 while setting the "capture count in auto bracketing" to three in the order setting menu of FIG. 8C.

Reference numeral 1001 denotes a display example of an index when the AEB correction width is ⅔ (the − correction value is the reference value−⅔, and the + correction value is the reference value +⅔). Reference numeral 1002 denotes a display example of an index when the AEB correction width is ⅓ (the − correction value is the reference value−⅓, and the + correction value is the reference value +⅓). Reference numeral 1003 denotes a display example of an index when the AEB correction width is 0, that is, no AEB correction value is set. In this case, no auto bracketing is performed. When the AEB correction width is ⅓ (display example 1002), it is changed to ⅔ (display example 1001) if the user rotates the main electronic dial 115 clockwise, and 0 (display example 1003) if he rotates the main electronic dial 115 counterclockwise. When the AEB correction width is 0 (display example 1003), it is changed to ⅓ (display example 1002) if the user rotates the main electronic dial 115 clockwise, but is not changed even if he rotates the main electronic dial 115 counterclockwise. In this manner, when the capture count is three, two, positive and negative correction values are set with respect to the reference value. The correction width serving as the difference between the reference value and each of the two correction values sequentially expands in accordance with a predetermined operation signal, and narrows in accordance with another operation signal until it reaches 0.

FIG. 10B shows a display example when the user operates the main electronic dial 115 while setting the "capture count in auto bracketing" to two in the menu of FIG. 8C. Reference numeral 1004 denotes a display example of an index when the AEB correction value [2] is the reference value +2/3. Reference numeral 1005 denotes a display example of an index when the AEB correction value [2] is the reference value +⅓. Reference numeral 1006 denotes a display example of an index when the AEB correction width is 0, that is, no AEB correction value [2] is set. In this case, no auto bracketing is performed. Reference numeral 1007 denotes a display example of an index when the AEB correction value [2] is the reference value −⅓. Reference numeral 1008 denotes a display example of an index when the AEB correction value [2] is the reference value −⅔.

When the AEB correction value [2] is the reference value +⅔ (display example 1004), it is changed to the reference value +⅓ (display example 1005) if the user rotates the main electronic dial 115 counterclockwise. When the AEB correction value [2] is the reference value +⅓ (display example 1005), it is changed to the reference value +⅔ (display example 1004) if the user rotates the main electronic dial 115 clockwise, and 0 (display example 1006) if he rotates the main electronic dial 115 counterclockwise.

When the AEB correction value [2] is 0 (display example 1006), it is changed to the reference Value +⅓ (display example 1005) if the user rotates the main electronic dial 115 clockwise, and the reference value −⅓ (display example 1007) if the user rotates the main electronic dial 115 counterclockwise. When the AEB correction value [2] is the reference value −⅓ (display example 1007), it is changed to 0 (display example 1006) if the user rotates the main electronic dial 115 clockwise, and the reference value −⅔ (display example 1008) if the user rotates the main electronic dial 115 counterclockwise.

As described above, when the capture count is two, a reference value and one correction value are set. The correction value sequentially increases within a predetermined range including positive and negative values with respect to the reference value in accordance with a predetermined operation signal, and sequentially decreases within the predetermined range in accordance with another operation signal. According to the embodiment, the index can cross the reference value "0" even at the setting of the AEB correction value [2] by operating the main electronic dial 115. Only operating the main electronic dial 115 can change the correction value to the positive side or negative side.

Figure 4:
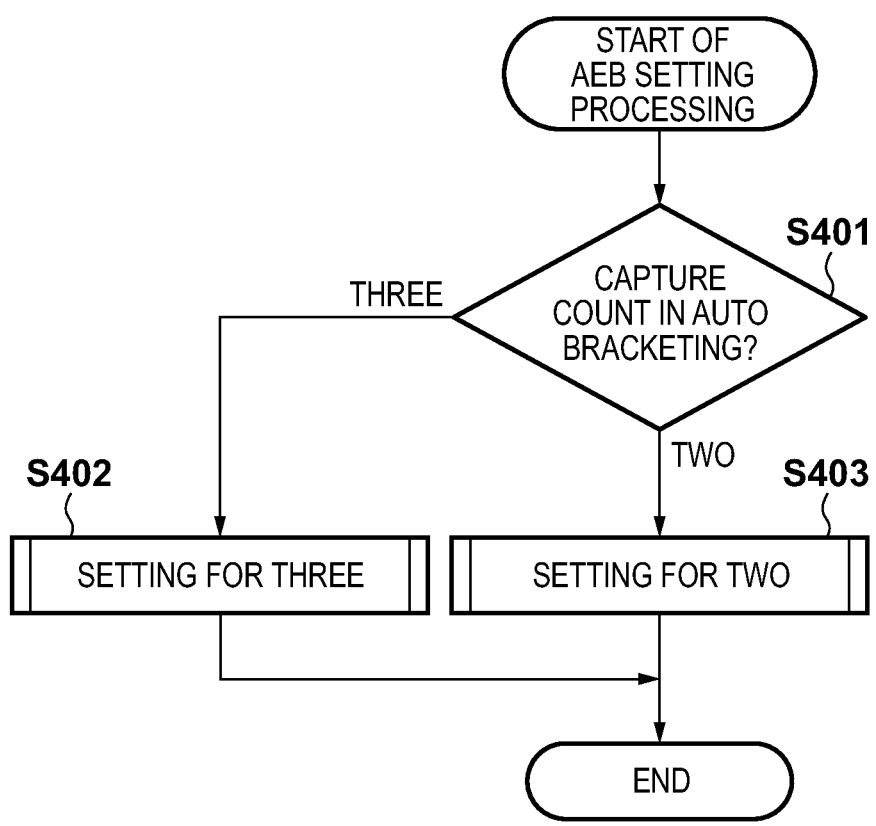
FIG. 4 is a flowchart showing an outline of AEB correction value change processing executed by the user from a menu.

An outline of AEB correction value change processing executed by the user from a menu will be explained with reference to the flowchart of FIG. 4. Note that details of processes in steps S402 and S403 of FIG. 4 will be described later with reference to the flowcharts of FIGS. 5 and 6.

When the user instructs the start of exposure correction/AEB setting, the system control circuit 50 determines the capture count setting in auto bracketing (step S401). If the capture count setting in auto bracketing is three, the system control circuit 50 performs setting processing for the capture count of three in AEB bracketing (step S402), and ends the process. If the capture count setting in auto bracketing is two, the system control circuit 50 performs setting processing for the capture count of two in AEB bracketing (step S403), and ends the process. Note that the capture count may be five or seven, a description of which will be omitted. For example, when the capture count is five, correction values are added on both the positive and negative sides at a correction width which is double the difference (correction width) between the correction value and the reference value corresponding to the capture count of three. When the capture count is seven, for example, the correction values corresponding to the capture count of five are added, and correction values are added on both the positive and negative sides at a correction width which is triple the correction width corresponding to the capture count of three.

Figure 5:
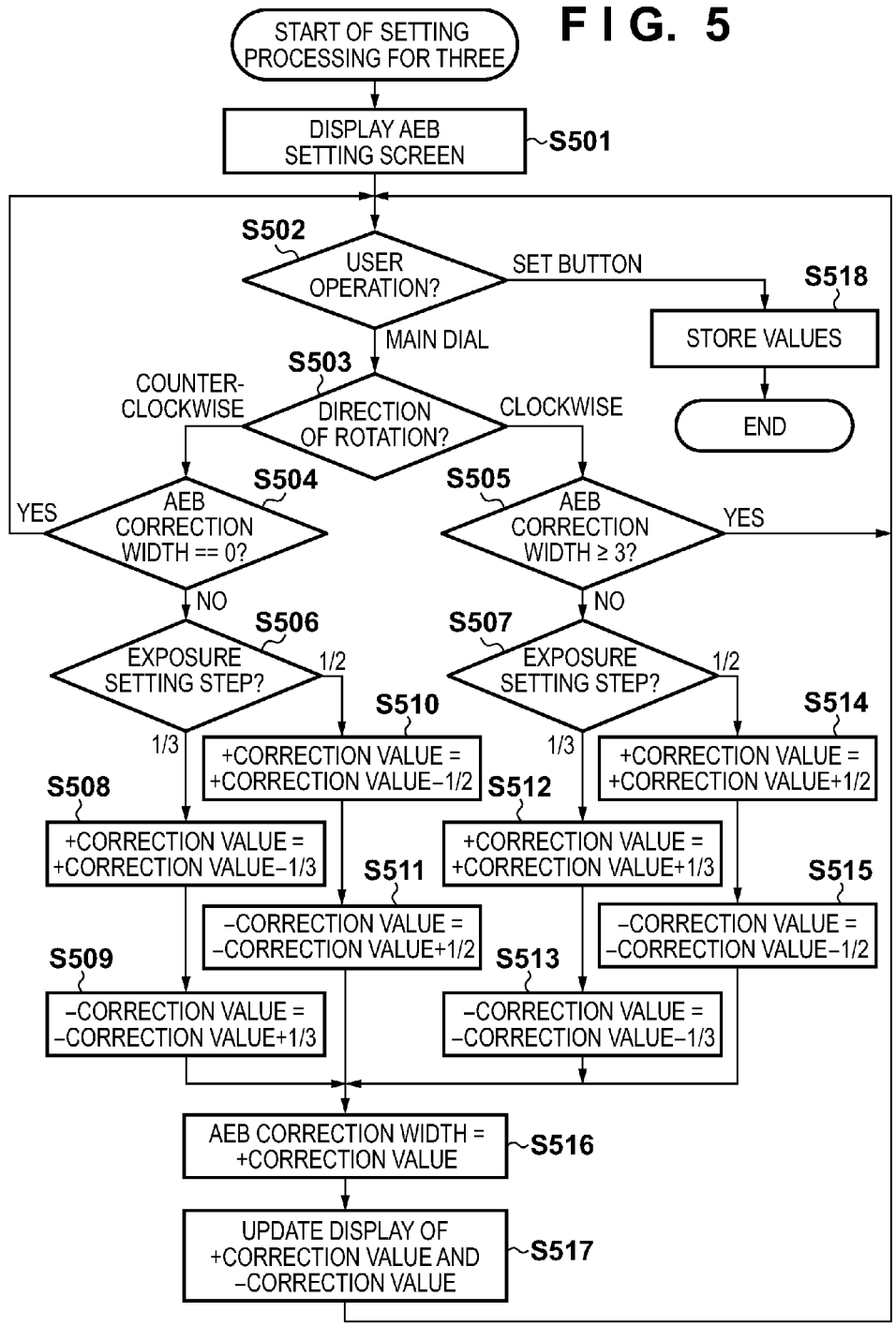
FIG. 5 is a flowchart showing details of setting processing for a capture count of three in AEB bracketing in step S402 of FIG. 4.

Details of setting processing for the capture count of three in AEB bracketing in step S402 of FIG. 4 will be explained with reference to the flowchart of FIG. 5. In setting processing for the capture count of three in AEB bracketing, exposure correction/AEB setting processing when the capture count in auto bracketing is set to three is executed.

First, the system control circuit 50 displays the exposure correction/AEB setting screen (FIG. 8A) based on information including an exposure correction value, AEB correction width, + correction value, − correction value, capture count in auto bracketing, and exposure setting step (step S501). Then, the system control circuit 50 determines a user operation (step S502). If the user operation is an operation to the main electronic dial 115, the system control circuit 50 determines the direction of rotation of the main electronic dial 115 (step S503). If the direction of rotation of the main electronic dial 115 is counterclockwise, the process advances to step S504; if it is clockwise, to step S505.

If the direction of rotation of the main electronic dial 115 is counterclockwise, the system control circuit 50 determines whether the AEB correction width is 0 (step S504). If the AEB correction width is 0, the process returns to step S502. If the AEB correction width is nonzero, the system control circuit 50 determines the exposure setting step (step S506). If the exposure setting step is ⅓, the system control circuit 50 subtracts ⅓ from the + correction value (step S508), adds ⅓ to the − correction value (step S509), and advances the process to step S516. If the exposure setting step is ½, the system control circuit 50 subtracts ½ from the + correction value (step S510), adds ½ to the − correction value (step S511), and advances the process to step S516.

To the contrary, if the direction of rotation of the main electronic dial is clockwise, the system control circuit 50 determines whether the AEB correction width is equal to or larger than 3 (step S505). If the AEB correction width is equal to or larger than 3, the process returns to step S502. If the AEB correction width is smaller than 3, the system control circuit 50 determines the exposure setting step (step S507). If the exposure setting step is ⅓, the system control circuit 50 adds ⅓ to the + correction value (step S512), and subtracts ⅓ from the − correction value (step S513). If the exposure setting step is ½, the system control circuit 50 adds ½ to the + correction value (step S514), and subtracts ½ from the − correction value (step S515). After that, the system control circuit 50 updates the AEB correction width by the + correction value (step S516), updates the display of the + correction value and − correction value on the exposure correction/AEB setting screen (FIG. 8A) (step S517), and returns the process to step S502.

If the user operation is an operation to the SET button 117 in step S502, the system control circuit 50 stores a displayed exposure correction value, AEB correction width, + correction value, and − correction value in the memory 52 (step S518), and ends the process.

Figure 6:
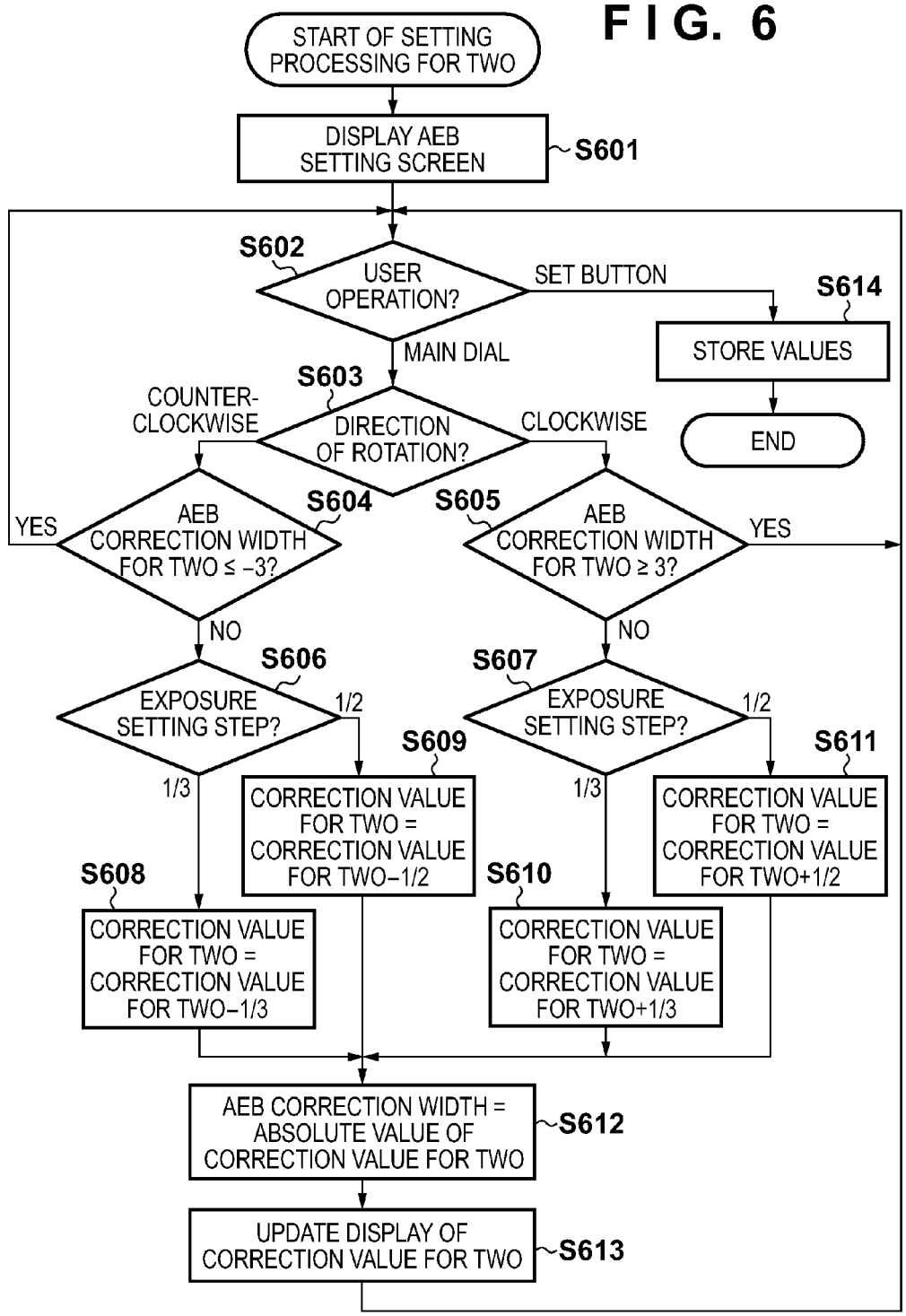
FIG. 6 is a flowchart showing details of setting processing for a capture count of two in AEB bracketing in step S403 of FIG. 4.

Details of setting processing for the capture count of two in AEB bracketing in step S403 of FIG. 4 will be explained with reference to the flowchart of FIG. 6. In setting processing for the capture count of two in AEB bracketing, exposure correction/AEB setting processing when the capture count in auto bracketing is set to two is executed.

First, the system control circuit 50 displays the exposure correction/AEB setting screen (FIG. 8A) based on information including an exposure correction value, AEB correction width, AEB correction value [2], capture count in auto bracketing, and exposure setting step (step S601). Then, the system control circuit 50 determines a user operation (step S602). If the user operation is an operation to the main electronic dial 115, the system control circuit 50 determines the direction of rotation of the main electronic dial 115 (step S603). If the direction of rotation of the main electronic dial 115 is counterclockwise, the process advances to step S604; if it is clockwise, to step S605.

If the direction of rotation of the main electronic dial 115 is counterclockwise, the system control circuit 50 determines whether the AEB correction value [2] is equal to or smaller than −3 (step S604). If the AEB correction width is equal to or smaller than −3, the process returns to step S602. If the AEB correction width is larger than −3, the process advances to step S606. The system control circuit 50 determines the exposure setting step amount (step S606). If the exposure setting step is ⅓, the system control circuit 50 subtracts ⅓ from the AEB correction value [2] (step S608), and advances the process to step S612. If the exposure setting step is ½, the system control circuit 50 subtracts ½ from the AEB correction value [2] (step S609), and advances the process to step S612.

If the direction of rotation of the main electronic dial 115 is clockwise, the system control circuit 50 determines whether the AEB correction value [2] is equal to or larger than 3 (step S605). If the AEB correction value [2] is equal to or larger than 3, the process returns to step S602. If the AEB correction value [2] is smaller than 3, the system control circuit 50 determines the exposure setting step amount (step S607). If the exposure setting step is ⅓, the system control circuit 50 adds ⅓ to the AEB correction value [2] (step S610), and advances the process to step S612. If the exposure setting step is ½, the system control circuit 50 adds ½ to the AEB correction value [2] (step S611). Then, the system control circuit 50 updates the AEB correction width by the absolute value of the AEB correction value [2] (step S612), updates the display of the correction value corresponding to the capture count of two (step S613), and returns the process to step S602.

If the user operation is an operation to the SET button 117 in step S602, the system control circuit 50 stores a displayed exposure correction value, AEB correction width, and AEB correction value [2] in the memory 52 (step S614), and ends the process. As described above, in the embodiment, when the capture count is changed from three to two, a correction value used first in a set capture order out of two correction values corresponding to the capture count of three is set as the initial value of a correction value corresponding to the capture count of two (initial value of the AEB correction value [2]). By processing of FIG. 6, the AEB correction value [2] is changed from the initial value and set to a value based on a user operation. Further, when the capture count is changed from two to three, the AEB correction value [2] serves as an AEB correction width corresponding to the capture count of three. That is, the value of the AEB correction width held in step S518 is overwritten by overwrite processing of the AEB correction value [2] in step S614.

The embodiment implements the following operation in an image capture apparatus capable of auto bracketing to obtain a plurality of images by setting the set value of the aforementioned capture setting item to a reference value and at least one correction value:

When the capture count of auto bracketing is N (N is an integer of three or more), N−1 correction values are set on the positive and negative sides with respect to the reference value, and the absolute values of the + and − AEB correction widths are expanded within a predetermined range (up to the reference value ±3 in the above example) including positive and negative values with respect to the reference value in accordance with the first operation signal corresponding to the first operation (for example, the clockwise rotation operation of the main electronic dial 115).

the absolute values of the + and − AEB correction widths are sequentially decreased up to 0 in accordance with the second operation signal corresponding to the second operation (for example, the counterclockwise rotation operation of the main electronic dial 115).

When the AEB correction width becomes 0 (AEB correction value becomes equal to the reference value), the correction value setting is not changed (correction width =0 is not crossed) even if the second operation is further executed.

In contrast, when the capture count is two, the AEB correction value is sequentially increased within a predetermined range (range of up to the reference value + maximum correction width; range of the reference value +3 in the above example) in accordance with the first operation signal corresponding to the first operation.

the AEB correction value is sequentially decreased within a predetermined range (range of up to the reference value − maximum correction width; range of the reference value −3 in the above example) in accordance with the second operation signal corresponding to the second operation.

When the − correction value is increased by the first operation and becomes equal to the reference value, the correction value is changed to the positive side (correction width =0 is crossed) if the first operation is further executed.

Similarly, when the + correction value is decreased by the second operation and becomes equal to the reference value, the correction value is changed to the negative side (correction width =0 is crossed) if the second operation is further executed.

In the above description, the first and second operations for changing the correction width or correction value are the clockwise and counterclockwise rotation operations of the main electronic dial 115. However, the present invention is not limited to this. In the above operation example, the AEB correction width or AEB correction value expands or increases in accordance with the first operation signal, and narrows or decreases in accordance with the second operation signal. However, the present invention is not limited to this. For example, the AEB correction width may expand and the AEB correction value may decrease in accordance with the first operation signal. If N is an odd number of three or more, correction values are set by the same number on the positive and negative sides with respect to the reference value. However, if N is an even number of four or more, correction values set on the positive and negative sides with respect to the reference value differ in number (one more correction value is set on one side than on the other side). In this case, which of the positive and negative sides has one more correction value may be determined in advance or set by the user.

Next, auto bracketing processing will be explained with reference to the flowchart of FIG. 7. When the image capture apparatus enters a capture preparation state in response to the shutter switch (SW1) 62 or the like, the system control circuit 50 obtains an exposure correction value for use in capture (S701). At this time, the system control circuit 50 obtains an exposure correction value for use in capture based on information including an exposure correction value (reference value) set by the user, + correction value, − correction value, AEB correction value [2], capture count in auto bracketing, auto bracketing order, and AEB bracketing number. For example, a case in which the capture count in auto bracketing is two, the auto bracketing order is −→0→+, the exposure correction value is +1, the AEB correction value [2] is the exposure correction value (reference value) +⅓ (that is, 1+⅓), and the AEB bracketing number is 1 will be explained. Although "−" is set for the first image in the auto bracketing order, the AEB correction value [2] exists on the positive side with respect to the exposure correction value, so "−" is ignored. Since "0" comes next, the correction value for use in capture becomes the exposure correction value serving as the reference value +1. If the AEB number indicates the second image, "+" comes next and the correction value for use in capture becomes 1+⅓. In this way, images are captured in an order in which capture at a nonexistent correction value in auto bracketing is skipped in a set auto bracketing order.

Then, the system control circuit 50 performs photometry arithmetic processing to determine a shutter speed (CCD accumulation time), f-number, and the like based on the correction value obtained in step S701 or the like (step S702). The system control circuit 50 performs a distance measurement operation according to a known phase difference detection method to focus on the object (step S703), and drives the lens based on data obtained by the distance measurement operation (step S704). If the user executes a capture operation with the shutter switch (SW2) or the like (step S705), the system control circuit 50 performs a capture operation, (step S706), performs post-processing of capture (step S707), and ends the process. The capture operation includes CCD gain setting, CCD accumulation operation, CCD readout, image processing, and image write. In post-processing of capture in step S707, the system control circuit 50 increments the AEB number by one. If the resultant AEB number exceeds the capture count of AEB bracketing, the AEB number is reset to 0. If no capture operation is detected in step S705, the process ends.

Note that the sign of the correction value corresponding to the capture count of two may be determined using a set value in the capture order of −, 0, and + in auto bracketing (for example, when − comes first in the auto bracketing order, − is determined as the sign of the correction value corresponding to the capture count of two). However, the capture order of auto bracketing is set to facilitate comparison between image exposures by changing the alignment order (display order) of images captured by auto bracketing to an order of the user preference. The capture order of auto bracketing is used for a purpose different from an original purpose to determine the sign of the correction value. As a result, the user interface becomes unfriendly to the user. Unlike this, according to the embodiment, no auto bracketing order setting need be changed for sign setting of the correction value corresponding to the capture count of two. More specifically, the order setting menu shown in FIG. 8B has a function of setting only the auto bracketing order, so the auto bracketing order function becomes friendly.

In the above-described example, one image is captured in accordance with one capture instruction (SW2). However, one set of images may be captured continuously (plurality of times) in accordance with one capture instruction (SW2). Also, in the above-described example, exposure-based auto bracketing has been explained. However, the present invention is not limited to exposure-based auto bracketing and is also applicable to auto bracketing based on another capture condition. For example, the present invention is applicable to even a method of setting a correction value with respect to the reference value of auto bracketing in terms of flash photography, shutter speed, f-number, white balance, ISO sensitivity, or focus. Further, the present invention is applicable to even a method of setting a correction value with respect to the reference value when capturing images a plurality of times while changing the capture condition such as exposure or ISO sensitivity, as in HDR (High Dynamic Range) capture or multiple exposure capture. That is, one or a combination of the aforementioned items can be applied as the capture setting item which is changed in auto bracketing.

Note that one hardware component may perform control of the system control circuit 50, or a plurality of hardware components may share processing to control the overall apparatus.

The present invention has been described in detail based on the preferred embodiment. However, the present invention is not limited to the specific embodiment, and includes various forms without departing from the scope of the invention. Further, the above-described embodiment is merely an example of the present invention, and embodiments can be properly combined.

In the above-described embodiment, the present invention is applied to a digital camera. However, the present invention is not limited to this example, and is applicable to an image capture apparatus capable of auto bracketing and a control method thereof. That is, the present invention is applicable to a camera-equipped PDA, a camera-equipped mobile phone, a camera-equipped music player, a camera-equipped game machine, a camera-equipped electronic book reader, and a personal computer capable of remote-controlling an image capture apparatus.

According to the present invention, even when the capture count in auto bracketing is two, a correction value can be set easily.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-100137, filed Apr. 27, 2011, which is hereby incorporated by reference herein in its entirety.

What is claimed is:

1. An image capture apparatus capable of auto bracketing to obtain a plurality of images by setting a set value of a capture setting item to a reference value and at least one correction value, comprising:
    a setting unit configured to set a capture count in the auto bracketing in accordance with a user operation; and
    a change unit configured to change the correction value in the auto bracketing within a predetermined range including a positive value and negative value with respect to the reference value in accordance with a first operation signal and second operation signal corresponding to user operations,
    wherein when the capture count is N (N is an integer of not less than three), a total of N−1 correction values are set by at least one on each of a positive side and negative side with respect to the reference value, and said change unit sequentially expands a correction width serving as a difference between the reference value and each of the N−1 correction values in accordance with one operation signal out of the first operation signal and the second operation signal, and sequentially narrows the correction width in accordance with the other operation signal until the correction width reaches 0, and
    when the capture count is two, the reference value and one correction value are set, and said change unit sequentially increases said one correction value within the predetermined range in accordance with one operation signal out of the first operation signal and the second operation signal, and sequentially decreases said one correction value within the predetermined range in accordance with the other operation signal.

2. The apparatus according to claim 1, wherein when the capture count is three, a total of two correction values are set by one on each of the positive side and negative side with respect to the reference value, and said change unit sequentially expands the correction width in accordance with the first operation signal, and sequentially narrows the correction width in accordance with the second operation signal, and when the capture count is two, said change unit sequentially increases the correction value within the predetermined range in accordance with the first operation signal, and sequentially decreases the correction value within the predetermined range in accordance with the second operation signal.

3. The apparatus according to claim 1, further comprising an order setting unit configured to set, as a capture order in the auto bracketing, an order of capture using the reference value, capture using a positive correction value with respect to the reference value, and capture using a negative correction value with respect to the reference value,
wherein when the capture count is two, the auto bracketing is performed in an order in which capture at a nonexistent correction value is skipped in the order set by said order setting unit.

4. The apparatus according to claim 1, further comprising a unit configured to, when said setting unit changes the capture count from three to two, set, as a correction value corresponding to the capture count of two, a correction value used first in a capture order in the auto bracketing out of correction values corresponding to the capture count of three.

5. The apparatus according to claim 1, wherein when said setting unit changes the capture count from three to five, correction values are added by one on each of the positive side and negative side with respect to the reference value, and a difference between each of the added correction values and the reference value is set to be double the correction width corresponding to the capture count of three.

6. The apparatus according to claim 1, further comprising a reference value setting unit configured to set the reference value in accordance with a user operation.

7. The apparatus according to claim 1, wherein the capture setting item in the auto bracketing is at least one of exposure, shutter speed, ISO, white balance, flash, focus, aperture, and HDR.

8. A method of controlling an image capture apparatus capable of auto bracketing to obtain a plurality of images by setting a set value of a capture setting item to a reference value and at least one correction value, comprising the steps of:
causing a setting unit to set a capture count in the auto bracketing in accordance with a user operation; and
causing a change unit to change the correction value in the auto bracketing within a predetermined range including a positive value and negative value with respect to the reference value in accordance with a first operation signal and second operation signal corresponding to user operations,
wherein when the capture count is N (N is an integer of not less than three), a total of N−1 correction values are set by at least one on each of a positive side and negative side with respect to the reference value, and in the step of causing the change unit to change the correction value, a correction width serving as a difference between the reference value and each of the N−1 correction values is sequentially expanded in accordance with one operation signal out of the first operation signal and the second operation signal, and the correction width is sequentially narrowed in accordance with the other operation signal until the correction width reaches 0, and
when the capture count is two, the reference value and one correction value are set, and in the step of causing the change unit to change the correction value, said one correction value is sequentially increased within the predetermined range in accordance with one operation signal out of the first operation signal and the second operation signal, and said one correction value is sequentially decreased within the predetermined range in accordance with the other operation signal.

9. A non-transitory computer readable medium storing a program for causing a computer of an image capture apparatus capable of auto bracketing to obtain a plurality of images by setting a set value of a capture setting item to a reference value and at least one correction value, to execute the steps of:
setting a capture count in the auto bracketing in accordance with a user operation; and
changing the correction value in the auto bracketing within a predetermined range including a positive value and negative value with respect to the reference value in accordance with a first operation signal and second operation signal corresponding to user operations,
wherein the program causes the computer to, when the capture count is N (N is an integer of not less than three), set a total of N−1 correction values by at least one on each of a positive side and negative side with respect to the reference value, and in the step of changing the correction value, sequentially expand a correction width serving as a difference between the reference value and each of the N−1 correction values in accordance with one operation signal out of the first operation signal and the second operation signal, and sequentially narrow the correction width in accordance with the other operation signal until the correction width reaches 0, and
the program causes the computer to, when the capture count is two, set the reference value and one correction value, and in the step of changing the correction value, sequentially increase said one correction value within the predetermined range in accordance with one operation signal out of the first operation signal and the second operation signal, and sequentially decrease said one correction value within the predetermined range in accordance with the other operation signal.

* * * * *